United States Patent [19]
Godot

[11] 3,886,692
[45] June 3, 1975

[54] MACHINES FOR TRIMMING AND BEVELLING OPHTALMIC LENSES

[75] Inventor: Jean-Marie Godot, Brunoy, France

[73] Assignee: Essilor International (Compagnie Generale d'Optique), Joinville-le-Pont, France

[22] Filed: Oct. 9, 1974

[21] Appl. No.: 513,497

[30] Foreign Application Priority Data
Oct. 9, 1973 France .............................. 73.36000

[52] U.S. Cl. .......................................... 51/101 LG
[51] Int. Cl. ............................................. B24b 9/14
[58] Field of Search ............ 51/101 R, 101 LG, 284

[56] References Cited
UNITED STATES PATENTS
| | | | |
|---|---|---|---|
| 2,612,734 | 10/1952 | Taig | 51/101 LG |
| 3,087,285 | 4/1963 | Lissac | 51/101 LG |
| 3,121,979 | 2/1964 | Gray et al. | 51/101 LG |

Primary Examiner—Donald G. Kelly
Assistant Examiner—Nicholas P. Godici

[57] ABSTRACT

This machine for trimming and bevelling ophthalmic lenses, of the type wherein, during the penetration of the tool into the lens material, the operative portion of the tool remains substantially on a portion of a so-called meniscus sphere centered to the spindle axis and located within the lens thickness, comprises guide means for modifying apparently the radius of said meniscus-forming sphere, whereby the pivotal mounting of a meniscus-forming-rod on the machine frame can be shifted along a path extending substantially parallel to the chord $O_m O_M$ of a circular arc $O_M O O_m$ centered to the operative portion T of the tool and described by the point O of the axis 8 of the spindle which is located at a distance from the operative portion of the tool which is equal to the length of said meniscus-forming rod when said spindle is shifted between its two end most positions. (FIG. 2).

6 Claims, 5 Drawing Figures

MACHINES FOR TRIMMING AND BEVELLING OPHTALMIC LENSES

BACKGROUND OF THE INVENTION

1. Field Of the Invention

This invention relates in general to machines for trimming and bevelling ophthalmic lenses, and has particular reference to machines of this type which comprise a frame supporting a tool and a contact feeler adapted to engage a trimming templet, the tool and the contact feeler defining together a feeler-tool line, a rotatably driven spindle arranged to support said templet and a lens to be edged, and having its axis parallel to said feeler-tool line, a support movable in relation to said frame and having said spindle rotatably mounted therein, connecting and guide means for connecting said spindle support to said frame and guiding same in such a manner that during the penetration of said tool into the lens material as a consequence of the relative movement produced between said frame and the spindle support, and operative portion of the tool remains substantially on a portion of a sphere, usually referred to as the meniscus sphere, centered to the spindle axis and located within the lens thickness, said guide means comprising at least one connecting-rod pivoted at one end to said frame and at the opposite end to said spindle support, said connecting-rod corresponding in length to the radius of the meniscus sphere and being likewise referred to as a meniscus-forming rod.

More particularly, the present invention is concerned with improvements in or relating to ophthalmic lenses trimming and bevelling machines of the type broadly set forth hereinabove, and has specific reference to improved means for adjusting the radius of said meniscus-forming sphere.

2. Description of the Prior Art

In known machines of the type set forth hereinabove, such as those disclosed in the French Pat. Nos. 1,261,435 and 1,312,689, the length of the meniscus-forming rod or rods is adjustable so that the value of the radius of the meniscus sphere can be adjusted accordingly. However, any change in the length of said meniscus-forming rod or rods is attended by a change in the position of the lens-supporting spindle in relation to the tool, so that some additional means must be provided for shifting the spindle support in the proper direction for restoring the lens edge to be trimmed and bevelled in proper registration with the tool. As a rule, in known improved machines of this type wherein the tool actually consists of a set of grinding wheels disposed side-by-side along the above-defined feeler-tool line, the above-mentioned additional adjustment can be achieved by using adjustment means usually provided for shifting the spindle support in a direction parallel to said feeler-tool line, in order to bring successively the ophthalmic lens to be trimmed and bevelled in front of the various grinding wheels of the machine. In any case, even if an additional adjustment device of this general character is already provided in the machine, it will be noted that two adjustments; namely an adjustment of the length of one or both meniscus-forming rods and an adjustment of the position of the spindle support in the axial direction of the spindle, must be carried out for modifying the length of the radius of the above-defined meniscus sphere, so that the adjustment operations tend to become detrimentally complicated. Moreover, as the minimum and maximum values of the radius of the meniscus sphere may be relatively remote from each other, the spindle support may have to be shifted through a relatively great distance in the axial direction of the spindle for restoring each time the lens edge in proper registration with the tool, so that the slideways usually provided to this end in hitherto known machines must necessarily have a considerable length implying the use of a very sturdy component elements, with a consequent increment in the overall dimensions, weight and cost of the machine.

SUMMARY OF THE INVENTION

It is the essential object of the present invention to avoid these inconveniences by providing, in a lens trimming and bevelling machine of the type set forth hereinabove, and adjustment device for the purpose explained hereinabove, which is particularly simple to construct and operate, this device requiring only one adjustment operation with approximations to be explained in detail presently.

To this end, the invention provides a machine for trimming and bevelling ophthalmic lenses, which comprises a frame carrying a tool and a contact feeler for a trimming templet, said tool and feeler defining together a feeler-tool line, a rotatably driven spindle for supporting said templet and a lens to be edged, and having its axis parallel to said feeler-tool line, a support movable in relation to said frame and having said spindle rotatably mounted therein, connecting and guide means for connecting said spindle support to said frame and guiding same in such a manner that, during the penetration of the tool into the lens material as a consequence of the relative movement between said frame and said spindle support, the operative portion of the tool remains substantially on a portion of a so-called meniscus sphere centered to the spindle axis and located within the thickness of said lens, said guide means comprising at least one meniscus-forming rod pivoted at one end to said frame and at the opposite end to said spindle support, and having a length equal to the radius of said meniscus sphere, said spindle being movable during the relative movements between said frame and said spindle support between two endmost positions corresponding to the minimum and maximum radii, respectively, for said lens trimming templets, and means for adjusting the radius of said meniscus sphere, characterized in that said adjustment means comprises second guide means allowing to shift the pivotal connection between said meniscus-forming rod and said frame along a path extending substantially parallel to the chord of a circular arc centered to the operative portion of said tool and having a radius equal to the length of said miniscus-forming rod, said circular arc being described by the point of said spindle axis which is spaced from the operative portion of the tool a distance equal to the length of said meniscus-forming rod when said spindle is moved between its two endmost positions, and blocking means for holding said pivotal connection of said meniscus-forming rod at a desired point of said path.

With this arrangement, and though the length of the meniscus-forming rod remains fixed, it is possible to adjust apparently the radius of the meniscus sphere either substantially without having to adjust the position of the spindle support in the axial direction of said spindle, or with only a very moderate degree of adjustment.

Now a detailed description of a practical embodiment of this invention will be described with reference to the attached drawings, in which:

DESCRIPTION OF THE PREFERRED EMBODIMENT

Figure 1:
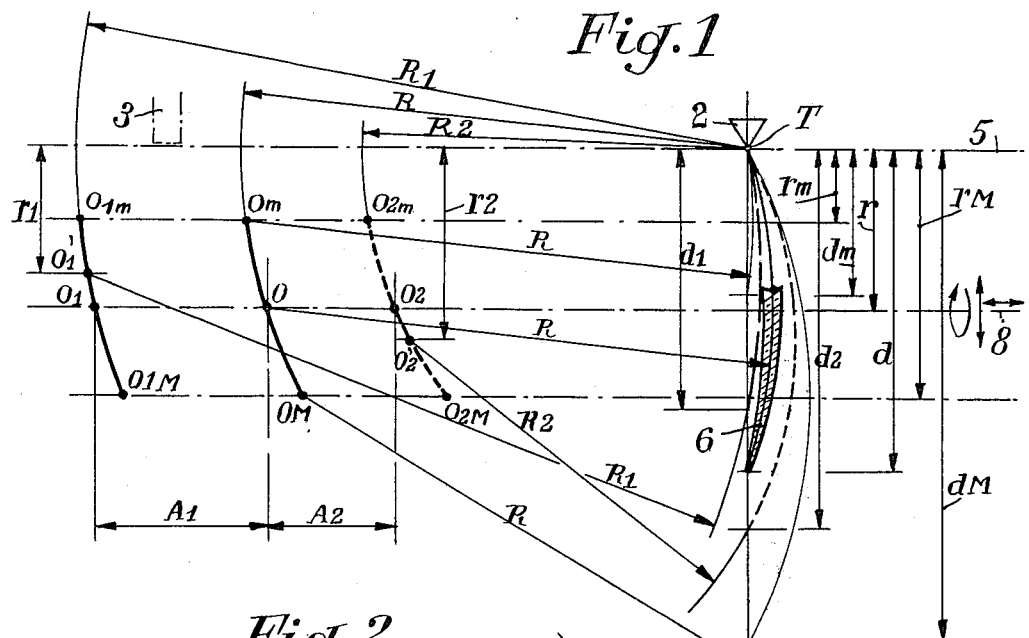
FIGS. 1 and 2 are diagrams illustrating the basic principle of the adjustment device of this invention.

Before describing in detail a practical embodiment of this invention, the principle on which the invention is based will be explained with reference to FIGS. 1 and 2, and also, for the sake of clarity, to FIGS. 3 and 4. In these Figures the dash and do lines 8 and 5 designate respectively the axis of rotary lens-holding spindle of the machine and a line drawn from the point of contact T between the tool 2 (shown in the form of a triangle) and the lens 6, to the point of contact between a templet or trimming model (not shown) carried by the lens-holding spindle and a fixed contact feeler 3 carried by the frame of the machine. The lens-holding spindle 7 (FIG. 3), of which the axis is designated by the reference numeral 8, is rotatably mounted in an auxiliary frame or support 9 which is so movable in relation to the main frame 1 that axis 8 remains constantly parallel to the line 5 during the relative movements between the spindle 7 and the machine frame 1. In a manner known per se, the spindle support 9 is furthermore guided in such a manner that, during the penetration of the tool into the lens material, the operative portion of the tool, i.e. the contact point T, remains constantly on a portion of a sphere referred to as the meniscus sphere, centered to axis 8 and located within the lens thickness. This guiding of the spindle support may be obtained by using one or a plurality of meniscus-forming rods or connecting-rods each pivoted at one end to the machine frame and at the opposite end to the spindle support, the length of said connecting-rod or rods being equal to the radius of the meniscus sphere, as disclosed for example in the above mentioned French Pat. Nos. 1,261,435 and 1,312,689, and also in the co-pending patent application Ser. No. 513,391 filed by the same applicant on Oct. 9, 1974 and entitled: "Machine for trimming and bevelling ophthalmic lenses".

Thus, for instance, and referring more particularly to FIG. 1, to trim and bevel an ophthalmic lens 6 having initially a diameter $d$ (or a radius $r$) the point T, considering the curvatures of the concave and convex faces of the lens, must remain on a portion of a sphere having for example a radius R and a centre lying at point O on axis 8. Under these conditions, as the tool penetrates into the lens material 6 (actually the tool is stationary and the lens-supporting spindle holding the lens to be trimmed and bevelled is moved in relation to said tool), the point O of the lens-holding spindle must describe a circular arc centered to said point T with a radius R. The points $O_m$ and $O_M$ lying on this circular arc designate the endmost positions attainable by the lens holding spindle. In FIGS. 1 and 2, the axis 8 is shown in a position corresponding to a mean position of the lens holding spindle between its two endmost positions. These two endmost positions attainable by the lens holding spindle correspond to the minimum radius $r_m$ and maximum radius $r_M$, respectively permitted by the trimming templets. This movement of point O may be obtained by connecting the spindle support to the frame structure of the machine by means of at least one meniscus-forming rod pivoted to the spindle support and to the machine frame and having a length R and pivot centres on said spindle support and the machine frame so disposed that they constitute with points O and T the four apices of a deformable parallelogram.

Under different operating conditions, considering for instance an ophthalmic lens to be trimmed which has an initial or blank diameter $d_1$ (or a radius $r_1$), the point T should remain on a meniscus sphere having its centre at point $O'_1$ on the spindle axis and having for instance (with due consideration for the curvatures of the concave and couvex faces of the lens) a radius $R_1$. In this case, during the penetration of the tool into the lens material said point $O'_1$ must be capable of describing a circular arc centered to said point T and having a radius $R_1$, the points $O_{1m}$ and $O_{1M}$ of this circular arc corresponding to the endmost positions of point $O'_1$ in the above-defined endmost positions of the lens holding spindle. Likewise, in the case of a lens having in its blank condition a diameter $d_2$ (or a radius $r_2$), the point T should for instance remain on a meniscus sphere centered at $O'_2$ and having a radius $R_2$. Under these conditions, when the tool penetrates into the lens material, the point $O'_2$ on the axis of the lens holding spindle must be capable of moving along a circular arc centered to point T and having a radius $R_2$, the limits of this circular arc being designated by the points $O_{2m}$ and $O_{2M}$ corresponding to the endmost positions of said point $O'_2$ in the endmost positions of said lens holding spindle.

A known method of adjusting the radius of the meniscus sphere, which is used in the machines disclosed in the above-mentioned French Pat. Nos. 1,261,435 and 1,312,689, consists in modifying the length of the meniscus-forming rod. However, as clearly apparent in FIG. 1, any change in the length of the meniscus-forming rod, for example from value R to value $R_1$, is attended by an axial shift of point O along the axis 8 of the lens holding spindle through a distance equal to the length of segment $OO_1$. Therefore, the end of the spindle holding the lens to be trimmed and bevelled is also shifted axially by the same amount so that, to bring the lens edge in proper registration with the tool, the lens-holding spindle must be displaced again to the same extent but in the reverse direction. Thus, with this prior art method two adjustments of the machine are required for each type of lens to be trimmed and bevelled.

In known machines the axial displacement of the lens-holding spindle is obtained by moving the spindle-supporting member in relation to the machine frame in a direction parallel to the axis 8 and to the above-defined line 5, with the assistance of suitable guiding slideways. Referring again to FIG. 1, and assuming that the radii $R_1$ and $R_2$ correspond to the maximum and minimum radii, respectively, that can be afforded for the meniscus sphere, it is clear that the spindle support must be capable of travelling axially through a distance at least equal to the distance ($A_1 + A_2$) corresponding to the length of segment $O_1O_2$. Therefore, considering the case of two very different lenses, the operator will have to shift the spindle support through a relatively great distance. In addition to the inconveniences already mentioned hereinabove, these adjustments may constitute a time-robbing operation for, in order to obtain a high degree of precision in the spindle support movements, the drive screw usually provided to this end can move the support only at a relatively slow rate.

Instead of moving the spindle support in a direction parallel to the axis 8 and line 5, it is also be possible to shift the pivotal connection between the meniscus-forming rod and the frame in a direction parallel to said axis 8 and line 5. Thus, for example, assuming that for the sake of simplifying the disclosure the aforesaid meniscus-forming rod were represented by the segment TO of FIG. 2 and that this rod were pivoted at T to the frame structure of the machine and at O to the lens-holding spindle, it will be seen that to change the value of the radius of the meniscus sphere for example from R to $R_1$, without modifying the initial position of the above-defined point O of the spindle, the meniscus-forming rod must be given a length equal to $R_1$ and its pivotal mounting or connection centre on the frame must be shifted from point T to point $M_1$ along line 5. Under these conditions, during the penetration of the tool into the lens material the point O will describe a circular arc $O_{1m} OO_{1M}$ identical with the arc designated by the same reference symbols in FIG. 1. Similarly, to obtain a meniscus radius equal to the value $R_2$ the meniscus-forming rod should have a length equal to this value $R_2$ and its pivotal connection on the frame should be shifted from point T to point $M_2$ along line 5. Under these conditions, the point O of the spindle axis 8 would describe a circular arc $O_{2m} OO_{2M}$ centered to point $M_2$ and identical with the circular arc designated by the same reference symbols in FIG. 1. However, as in the preceding case in which the spindle support was shifted in a direction parallel to the axis 8, also in this case two adjustments are necessary, that is, a first adjustment of the length of the meniscus-forming rod and a second adjustment of the position of the pivotal connection of this rod on the frame in a direction parallel to axis 8 and to line 5.

The present invention is based on the following remark. If, in FIG. 2, a circular arc centered to O and having a radius equal to R is drawn, this arc intersects the segment $OM_1$ at $P_1$ and the extension of segment $OM_2$ at $P_2$. Moreover, if a circular arc having a radius R centered to point $P_1$ is drawn so as to pass through point O, it will be seen that within the limits corresponding to the endmost positions of the lens holding spindle this circular arc substantially merges into the circular arc $O_{1m} O O_{1M}$ centered to point $M_1$ and having a radius equal to $R_1$. Similarly, if the circular arc having a radius R is drawn and centered to point $P_2$ so as to pass through point O, it will be seen that this circular arc substantially merges into the circular arc $O_{2m} O O_{2M}$ centered to point $M_2$ and having a radius equal to $R_2$. From a practical point of view, one may therefore infer that the radius of the meniscus sphere can be modified apparently without changing the length of the meniscus-forming rod by simply shifting the centre of the pivotal connection between this rod and the frame of the machine along the circular arc $P_1 T P_2$. Since this circular arc $P_1 T P_2$ has a moderate angular aperture, and provided that the same approximations as mentioned hereinabove are adhered to, it will be seen that instead of shifting the pivotal centre of the meniscus-forming rod on the frame along the circular arc $P_1 T P_2$, one may also shift this pivot point along the chord $P_1 P_2$ or along the tangent to this circular arc to point T. To sum up, the radius of the meniscus sphere can be modified apparently without changing the length of the meniscus-forming rod by shifting the pivotal centre between this rod and the frame along a path $P_1 P_2$ substantially parallel to the chord $O_m O_M$ of the circular arc $O_m O O_M$ centered to point T, having a radius equal to the length of the meniscusforming rod and described by the point O of the axis 8 of the lens-holding spindle when this spindle is moved between its two endmost positions. In any case, it will be seen that, assuming that $R_1$ and $R_2$ are the maximum and minimum possible values, respectively, to be contemplated for the radius of the meniscus sphere, it is only necessary to shift the pivotal centre of the rod on the frame in the above-mentioned direction a distance not greater than the distance ($B_1 + B_2$) which is definitely smaller than the distance ($A_1 + A_2$) required heretofore. Moreover, only one adjustment is required since, in this case, the length of the connecting-rod remains constant. The means contemplated for shifting the pivot centre of the connection between the rod and frame may be so arranged that it will act upon either said pivot centre or a point located on said meniscus-forming rod which lies between its two pivot centres. In the other above alternative, the total shift of the control member for displacing the pivot centre of the meniscus-forming rod on the frame from point $P_1$ to point $P_2$ will be even smaller than the above-defined distance ($B_1 + B_2$).

In the foregoing it has been assumed for the sake of convenience that the meniscus-forming connecting-rod was merged into segment OT. However, in actual practice, as a rule, the meniscus-forming connecting-rod will constitute with this segment OT a deformable parallelogram. Consequently, to obtain an apparent adjustment of the meniscus radius, the pivot centre between the meniscus-forming rod and the frame must be shifted not along the path $P_1 P_2$ but along a different path (circular arc, chord or tangent) which can be obtained by translating said path $P_1 P_2$ while remaining substantially parallel to said chord $O_m O_M$.

Figure 5:
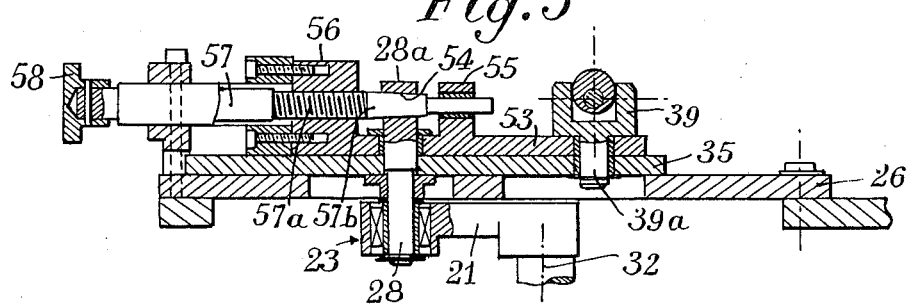
FIG. 5 is a section taken along the line V—V of FIG. 4.

Now a practical embodiment of the invention will be described in detail with reference to FIGS. 3, 4 and 5 of the drawings. The lens trimming and bevelling machine, of which one portion is illustrated in FIGS. 3 to 5, comprises essentially a frame 1, a lens-holding or supporting spindle 7, and auxiliary support or sub-frame 9 for supporting the spindle 7, which is connected and guided in relation to the frame on the one hand by means of a pair of connecting-rods 14 (of which only one is visible in FIG. 3) each pivoted to the frame through a universal joint 15 and to the support or sub-frame 9 through a pivotal connection 16, and on the other hand by means of a meniscus-forming rod 21 connected to the support 9 through a universal joint 22 and to the frame structure of the machine through a pivotal mounting 23. A machine of this type is fully described and illustrated in the above-mentioned copending patent application Ser. No. 513,391 entitled "Machine for trimming and bevelling ophthalmic lenses" and filed jointly with this application by the applicant on Oct. 9, 1974; thus, reference may be made to this copending application for obtaining more details on this machine.

The rod 21 is the meniscus-forming rod. More particularly, its length, that is, the distance from the pivot axis 28 to the axis 32 of the pivotal mounting 22, is equal to R and, since the length of this meniscus-forming rod is constant, the value of R is selected to correspond to the radius of a meniscus-forming sphere for example of medium value. For instance, the value of R may be the length of the radius of the so-called "base-6" sphere, which corresponds to 88.91 mm.

As already explained in the foregoing, in order to afford an apparent modification of the radius of the meniscus sphere, one may shift the pivot centre 23 of rod 21 on the machine frame 1. To this end, the pivot shaft 28 extends through an arcuate slot 51 formed in a sliding plate 35 (operable by means of control lever 37 as mentioned in the above-mentioned copending patent application). As illustrated more in detail in FIG. 4, this slot 51 extends along a circular arc having a radius R centered to the axis of the trunnion 39a (FIG. 5) of fork member 39. Furthermore, the general direction of said slot 51 is determined as explained hereinabove with reference to FIG. 2.

The shaft 28 may be shifted in its slot 51 by means of a control lever 52. More particularly, this lever 52 comprises an arm 53 pivoted on trunnion 39a and provided with a hole in which pivot axis 28 is fitted. Pivot axis 28 has a widened head 28a which projects above said arm 53 and has a tapered bore 54 formed therein. The arm 53 further comprises on either side of the hole receiving pivot axis 28 a pair of bearings 55 and 56 for a rod 57. This rod 57 has formed in succession therealong a screw-threaded portion 57a engaging a corresponding tapped hole formed in bearing 56, and a tapered portion 57b corresponding in shape to said tapered bore 54 and engaging same. At its end opposite that fitted in bearing 55 the rod 57 carries a control knob 58 whereby this rod 57 can be screwed in or out manually in the tapped hole of bearing 56. Thus, by screwing the rod 57 in the corresponding bearing 56 the engagement of the tapered portion 57b of said rod in the tapered bore 54 will cause the head 28a to be forced against the upper face of arm 53 so as to press this arm firmly against the plate 35 and hold it against movement. This will hold the pivot axis 28 in the position previously imparted thereto in the arcuate slot 51. To change the position of pivot axis 28 in slot 51 it is only necessary to unscrew the rod 57 by means of button 58 and to pivot the arm 53 about the trunnion 39a, by operating the button 58 in one or the other direction as shown by the double curved arrow 59 and then, after the pivot axis 28 has been brought to the desired new position, to screw in the rod 57 also by means of said knob 58 in order to block the arm 53 with respect to said plate 35. A guide member 61 secured to plate 26 and provided with a guide slot 61a is adapted to guide the movements of rod 56 in one or the other direction of said double curved arrow 59.

Figure 2:
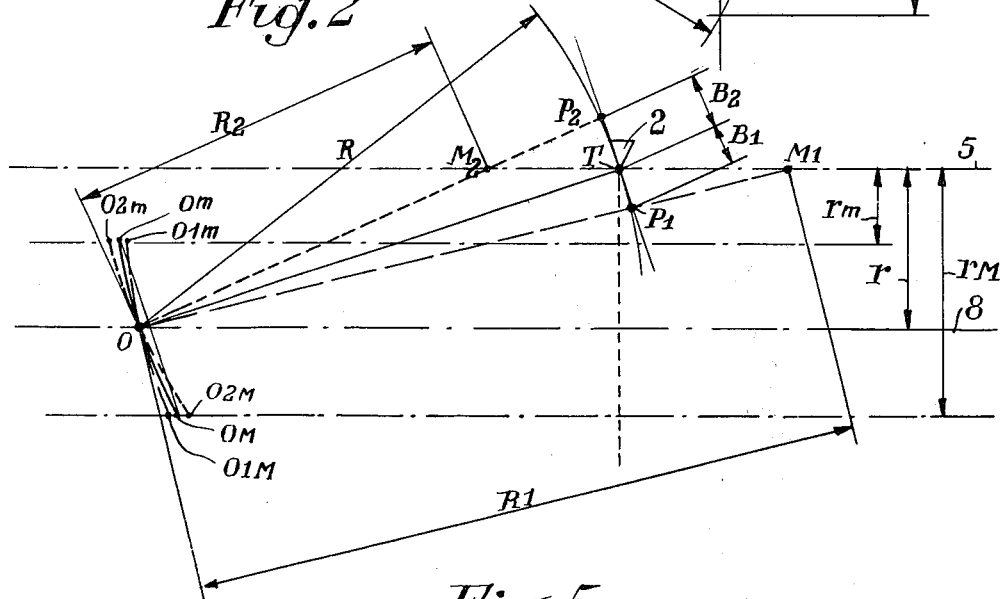
Figure 3:
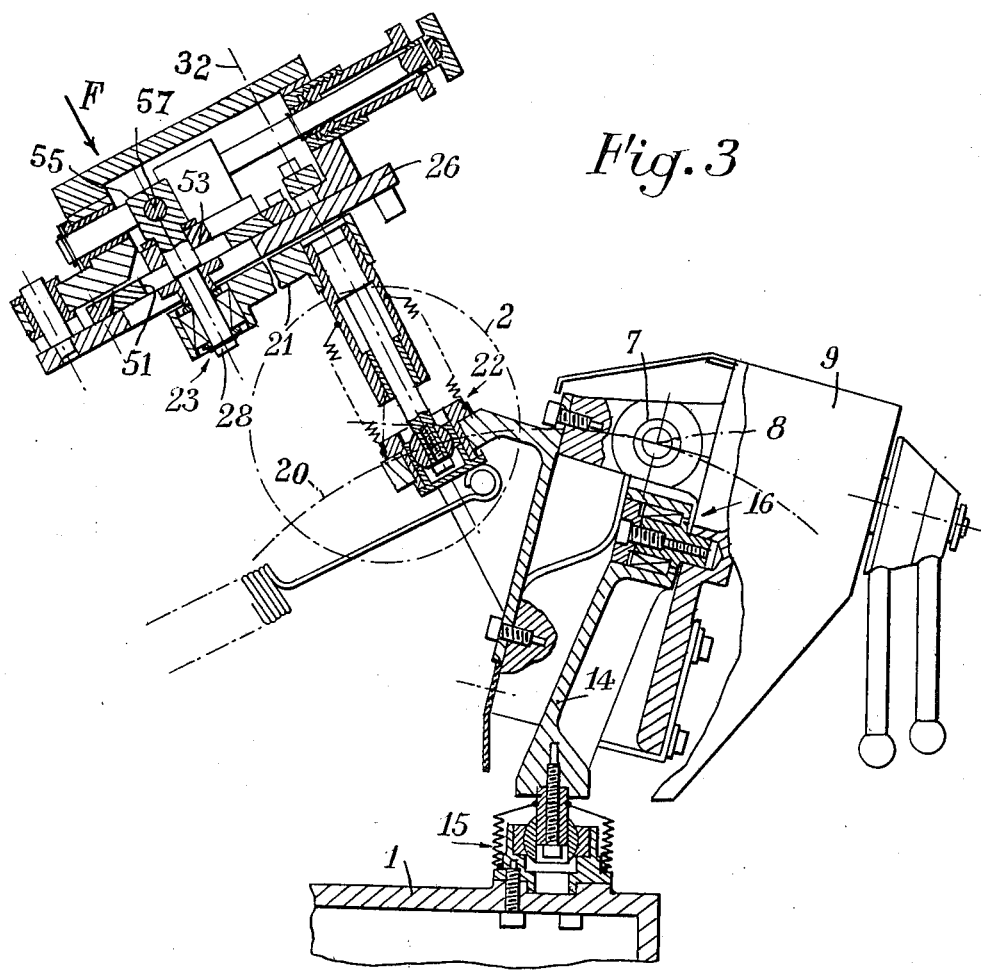
FIG. 3 is a fragmentary vertical section showing a lens trimming and bevelling machine incorporating a device according to this invention for adjusting the radius of the meniscus sphere.
Figure 4:
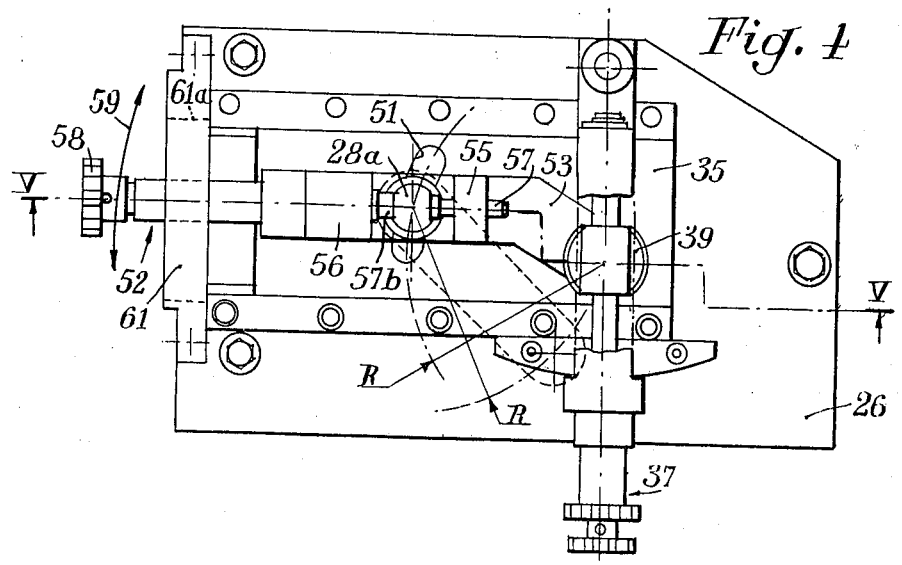
FIG. 4 is a view taken along the arrow F of FIG. 3, showing more particularly the adjustment device of this invention.

As already mentioned in the foregoing with reference to FIG. 2, the slot 51 may also have a straight shape and have the same general direction as the arcuate slot illustrated in FIG. 4. Of course, in this case, the hole formed in lever 53 and receiving pivot axis 28 must have an elongated shape to take due account of the fact that all the points of the straight slot are not equally spaced from the axis of trunnion 39a acting as a pivot for said arm 53.

On the other hand it is will be readily apparent to those conversant with the art that the specific form of embodiment described hereinabove is given by way of illustration, not of limitation, and that many modifications and variations may be brought thereto without inasmuch departing from the basic principles of the invention as set forth hereinabove. Thus, notably, although in FIGS. 3, 4 and 5 the invention is illustrated as being associated with, or applied to, the machine for trimming and bevelling ophthalmic lenses disclosed in the above-mentioned copending patent application, this invention is also applicable to the machines disclosed in the French Pat. Nos. 1,261,435 and 1,312,689 in lieu of the meniscus radius adjustment systems described in these two patents, and, more generally, to all lens trimming and bevelling machines comprising at least one meniscus-forming connecting-rod or like member pivoted at one end to the frame of the machine and at the opposite end to the lens-holding spindle support, and so arranged as to guide said support in such a manner that, during the penetration of the operative portion of the tool into the lens material, this portion will remain on a portion of a so-called meniscus sphere which is centered to the axis of said lens supporting spindle and located within the tickness of the lens to be machined.

What is claimed as new is:

1. A machine for trimming and bevelling ophthalmic lenses, which comprises a frame structure supporting a tool and a contact feeler for engaging a trimming templet, said tool and feeler defining together a feeler-tool line, rotatably driven spindle for supporting said templet and a lens to be edged, and having its axis parallel to said feeler-tool line, a support movable in relation to said frame and having said spindle rotatably mounted therein, connecting and guide means for connecting said spindle support to said frame and guiding same in such a manner that, during penetration of said tool into the lens material as a consequence of the relative movement between said frame and said spindle support, and operative portion of the tool remains substantially on a portion of a so-called sphere meniscus sphere centered to the spindle axis and located within the lens thickness, said guide means comprising at least one meniscus-forming rod pivoted at one end to said frame and at the opposite end to said spindle support, and having a length equal to the radius of said meniscus sphere, said spindle being movable during the relative movements between said frame and said spindle support between two endmost position corresponding to minimum and maximum radii, respectively, of the lens trimming templets, and means for adjusting the radius of said meniscus sphere, said adjustment means comprising second guide means allowing shift of the pivotal connection of said meniscus-forming rod on said frame along a path extending substantially parallel to the chord of a circular arc centered to said operative portion of the tool, having a radius equal to the length of said meniscus-forming rod and described by the point of the spindle axis which is located at a distance from the operative portion of the tool equal to the length of said meniscus-forming rod when said spindle is moved between its two endmost positions, and blocking means for holding said pivotal connection of said meniscus-forming rod at a selected point along said path.

2. A machine as set forth in claim 1, wherein said path is rectilinear.

3. A machine as set forth in claim 2, wherein said path is a circular arc which is deducted by translation from a circular arc of same radius as said meniscus-forming rod and centered to the pivot point of said meniscus-forming rod on said spindle support when said spindle is in a predetermined position between its two endmost position.

4. A machine as set forth in claim 3, wherein said predetermined position is the mean position of said spindle between its two endmost positions.

5. A machine as set forth in claim 1, wherein the length of said meniscus-forming rod is equal to the radius of a mean basic meniscus sphere.

6. A machine as set forth in claim 1, wherein said path is determined by a slot formed in a portion of said frame, and said pivotal connection between said meniscus-forming rod and the frame comprises a pivot axis which can be moved and blocked in a desired position in said slot by said blocking means.

* * * * *